United States Patent
Yoshida et al.

(10) Patent No.: US 11,791,905 B2
(45) Date of Patent: Oct. 17, 2023

(54) TECHNOLOGY FOR OPTICAL MODULATOR EVALUATION ON BASIS OF PHASE RECOVERY

(71) Applicant: NATIONAL INSTITUTE OF INFORMATION AND COMMUNICATIONS TECHNOLOGY, Tokyo (JP)

(72) Inventors: Yuki Yoshida, Tokyo (JP); Naokatsu Yamamoto, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 17/910,891

(22) PCT Filed: Mar. 5, 2021

(86) PCT No.: PCT/JP2021/008819
§ 371 (c)(1),
(2) Date: Sep. 12, 2022

(87) PCT Pub. No.: WO2021/187177
PCT Pub. Date: Sep. 23, 2021

(65) Prior Publication Data
US 2023/0120581 A1    Apr. 20, 2023

(30) Foreign Application Priority Data

Mar. 19, 2020   (JP) ................... 2020-048731

(51) Int. Cl.
*H04B 10/516*    (2013.01)
*H04B 10/564*    (2013.01)
*H04B 10/61*     (2013.01)

(52) U.S. Cl.
CPC ..... *H04B 10/6165* (2013.01); *H04B 10/5161* (2013.01); *H04B 10/564* (2013.01); *H04B 10/613* (2013.01)

(58) Field of Classification Search
CPC .............. H04B 10/5161; H04B 10/613; H04B 10/6165
See application file for complete search history.

(56) References Cited

U.S. PATENT DOCUMENTS 9,124,364 B1 *   9/2015  Sotoodeh ........... H04B 10/0799
2013/0216239 A1  8/2013  Zhang et al.
(Continued)

FOREIGN PATENT DOCUMENTS

JP    2015-516706 A    6/2015

OTHER PUBLICATIONS

Fludger et al., "Low Cost Transmitter Self-Calibration of Time Delay and Frequency Response for High Baud-Rate QAM Transceivers", Optical Society of America, 2017.
(Continued)

*Primary Examiner* — Nathan M Cors
(74) *Attorney, Agent, or Firm* — MYERS, WOLIN, LLC

(57) ABSTRACT

A system for estimating an imbalance between electrical-optical responses of an in-phase (I) channel and a quadrature (Q) channel in an optical amplitude and phase modulator (optical IQ modulator) includes an optical detector (PD), an analog-digital converter (ADC), and an imbalance operation unit that estimates an imbalance between electrical-optical responses of an I channel and a Q channel in the optical IQ modulator, wherein the imbalance operation unit includes an input signal information receiving unit that receives information regarding a first modulation signal, and an intensity information receiving unit that receives intensity information of the digitalized output signal from the ADC, and the
(Continued)

imbalance operation unit estimates an imbalance between electrical-optical responses of an I channel and a Q channel in the optical IQ modulator using information regarding a first modulation signal and intensity information of the digitalized output signal.

2 Claims, 6 Drawing Sheets

(56) References Cited

U.S. PATENT DOCUMENTS

| | | | |
|---|---|---|---|
| 2016/0112138 A1* | 4/2016 | Alfiad | H04B 10/50595 398/182 |
| 2018/0198531 A1* | 7/2018 | Bhandare | H04B 10/5057 |
| 2018/0248620 A1* | 8/2018 | Wang | H04B 10/532 |
| 2019/0132183 A1* | 5/2019 | Fan | H03D 3/009 |

OTHER PUBLICATIONS

Medeiros Diniz et al., "Optimization of DP-M-QAM Transmitter Using Cooperative Coevolutionary Genetic Algorithm", Journal of Lightwave Technology, Jun. 2018, pp. 2450-2462, vol. 36, No. 12.

Yoshida et al., "A Phase-Retrieving Coherent Receiver Based on Two-Dimensional Photodetector Array", Journal of Lightwave Technology, Jan. 2020, pp. 90-100, vol. 38, No. 1.

International Search Report of the International Searching Authority and Written Opinion issued by Japan Patent Office for corresponding International Patent Application No. PCT/JP2021/008819, dated May 25, 2021, 2022, with a partial English translation.

* cited by examiner

TECHNOLOGY FOR OPTICAL MODULATOR EVALUATION ON BASIS OF PHASE RECOVERY

CROSS-REFERENCE TO RELATED APPLICATION

This application is a national stage application under 35 U.S.C. 371 of International Application No. PCT/JP2021/008819, filed on Mar. 5, 2021 and designated the U.S., which claims priority to Japanese Patent Application No. 2020-048731, filed on Mar. 19, 2020. The contents of each are herein incorporated by reference.

TECHNICAL FIELD

The present invention relates to an optical modulator evaluation system. More specifically, the present invention relates to a system that can evaluate a property of an optical modulator using a simple optical detector and a property evaluation method of an optical modulator using the system.

BACKGROUND ART

A transmission capacity per fiber in a backbone optical network has improved nearly 2000-fold for the past 20 years. Above all, an efficiency of optical spectrum usage of a transceiver has improved 160- to 640-fold, which especially makes a large contribution. This remarkable improvement in the spectral efficiency (SE) results from adoption of, for example, an optical multi-level modulation format, such as QAM, a polarization-multiplexing transmission scheme, an optical spectrum shaping by Nyquist filter, and the like. In any of these, high-speed and extremely fine control of an optical field is required. However, in an optical in-phase and quadrature (IQ, quadrature amplitude) modulator in which a nested Mach-Zehnder interferometer widely used for high-speed modulation of the optical field or the like is used, there has been known that a signal distortion, which is what is called an IQ imbalance, exists due to a variation of path lengths and losses of optical waveguides or a variation of RF modulation signals by loss and the like of high-frequency amplifiers and PCB traces, and the problem is being actualized with the improvement of SE.

From now on, it is not economical to guaranty further improvement of SE only by an improvement in property of such an optical analog circuit (Analog coherent optics) or a high-frequency electrical analog circuit, and compensation of analog imperfection in optical transceiver front-ends by digital signal processing becomes necessary. To this end, a monitoring technique that evaluates a degree of imperfection of an optical modulation and feeds back the evaluation result to a digital compensation circuit becomes important.

As a monitoring technique for an optical I/Q modulation signal, there has been widely known a method using a well-calibrated optical coherent receiver referred to as an optical modulation analyzer or the like. However, this requires an expensive measurement instrument to be arranged immediately close to a modulator and is not suitable for integration into a transceiver (transponder) or in-service adaptive calibration. Although there have been proposed techniques of remotely estimating and compensating an IQ imbalance on a transmitter side by signal processing at a receiver side after transmission, in this case, analog imperfection of the receiver itself needs to be treated simultaneously, and complicated signal processing is required.

On the other hand, as a low-cost approach that ensures integration into a transmitter, there has been also proposed a method of estimating and calibrating an IQ imbalance in an optical IQ modulator based on intensity information of optical field by a photodetector (PD) without using a coherent receiver (see Non-patent Document 1 below). However, the method is on the premise of advance or simultaneous transmission of a pilot tone or a dither signal. In the former, in-service monitoring is difficult, and in the latter, especially in a high-order multi-level modulation scheme, deterioration in signal quality by the dither signal itself becomes a problem.

Furthermore, recently, it is pointed out that, in the high-order multi-level modulation, the degree of an IQ imbalance changing depending on an input frequency, which is what is called a frequency-dependent IQ imbalance, becomes a problem. However, most of the existing monitoring methods estimate a frequency non-selective IQ imbalance parametrically and cannot be used for estimation of the frequency-dependent IQ imbalance.

Non-patent Document 1: C. R. S. Fludger, T. Duthel, P. Hermann, and T. Kupfer, "Low cost transmitter self-calibration of time delay and frequency response for high baud-rate QAM transceivers," in Optical Fiber Communications Conference and Exhibition (OFC) (2017).

DISCLOSURE OF THE INVENTION

Problems to be Solved by the Invention

An object of the present invention is to provide a system for estimating an imbalance between electrical-optical responses of an in-phase (I) channel and a quadrature (Q) channel in an optical amplitude and phase modulator (optical IQ modulator) using a simple device.

Solutions to the Problems

Basically, the present invention is based on the following concept.

A problem to obtain an imbalance between electrical-optical frequency responses of an in-phase (I) channel and a quadrature (Q) channel in an optical amplitude and phase modulator with respect to a known modulation signal input is formulated as a phase retrieval problem. Then, even when a simple optical power detector is used, the frequency-dependent IQ imbalance in a modulator and a bias shift can be estimated.

A first invention relates to a property evaluation system of an optical amplitude and phase modulator (optical IQ modulator). The system is a system for estimating an imbalance between electrical-optical responses of an in-phase (I) channel and a quadrature (Q) channel in an optical amplitude and phase modulator.

The imbalance between the electrical-optical responses of the I channel and the Q channel in the optical IQ modulator includes, for example, any one or two or more of parameters regarding the imbalance of:

impulse responses and frequency responses of the I channel and the Q channel in the optical IQ modulator, a frequency dependence of a phase mismatch between the electrical-optical responses of the I channel and the Q channel in the optical IQ modulator, a frequency dependence of an amplitude mismatch between the electrical-optical responses of the I channel and the Q channel in the optical IQ modulator, a DC bias component of the I channel and the Q channel in the optical IQ modulator, and a frequency dependence of nonlinear distortions of the I channel and the Q channel in the optical IQ modulator.

This property evaluation system 1 of an optical amplitude and phase modulator has an optical detector (PD) 3, an analog-digital converter (ADC) 5, and an imbalance operation unit 11.

The optical detector (PD) 3 is an element for measuring an intensity component of a first output signal from an optical IQ modulator when a first modulation signal is input to the optical IQ modulator.

The analog-digital converter (ADC) 5 is an element for converting the intensity component of the first output signal received by the optical detector (PD) 3 into a digital signal to obtain intensity information of a digitalized output signal.

The imbalance operation unit 11 is an element for estimating the imbalance between electrical-optical responses of an I channel and a Q channel in the optical IQ modulator.

The imbalance operation unit 11 has an input signal information receiving unit 13 that receives information regarding the first modulation signal, and an intensity information receiving unit 15 that receives the intensity information of the digitalized output signal from the analog-digital converter (ADC) 5.

The imbalance operation unit estimates the imbalance between the electrical-optical responses of the I channel and the Q channel in the optical IQ modulator using the information regarding the first modulation signal and the intensity information of the digitalized output signal.

An example of the information regarding the first modulation signal is information ($E_{in}(t)$) regarding time change of an intensity and a phase of a signal of first modulation.

The imbalance operation unit 11 further has, for example, a phase retrieval operation unit 17 and an imbalance coefficient operation unit 19 to perform the above-described operation.

The phase retrieval operation unit 17 is an element that performs a phase retrieval operation for retrieving phase information of an output signal from intensity information ($|E(t)|^2$) of the digitalized output signal based on information (s(t)) regarding the first modulation signal.

The imbalance coefficient operation unit 19 is an element for calculating an imbalance parameter from a phase-retrieved output signal (E(t)) and the information (s(t)) regarding the first modulation signal.

The phase retrieval operation unit 17 estimates the imbalance between the electrical-optical responses of the I channel and the Q channel in the optical IQ modulator by calculating an imbalance coefficient by the imbalance coefficient operation unit 19 with respect to the phase-retrieved output signal (E(t)) obtained by the phase retrieval operation unit.

A second invention relates to a method for estimating an imbalance between electrical-optical responses of an in-phase (I) channel and a quadrature (Q) channel in an optical amplitude and phase modulator (optical IQ modulator). The method includes the following steps.

A first modulation signal is input to an optical IQ modulator.

A first output signal is output after an optical signal input to the optical IQ modulator undergoes IQ modulation based on the first modulation signal by the optical IQ modulator.

An optical detector (PD) measures an intensity component of the first output signal after receiving the first output signal.

An analog-digital converter (ADC) converts the intensity component of the first output signal measured by the optical detector (PD) into a digital signal to obtain intensity information of a digitalized output signal.

An imbalance estimating device receives information regarding the first modulation signal.

The imbalance estimating device receives the intensity information of the digitalized output signal from the ADC.

The imbalance estimating device estimates an imbalance between electrical-optical responses of an I channel and a Q channel in the optical IQ modulator using the information regarding the first modulation signal and the intensity information of the digitalized output signal.

Advantageous Effects of the Invention

With the system and the method of the present invention, by regarding the problem to obtain the imbalance between the electrical-optical responses of the in-phase (I) channel and the quadrature (Q) channel in the optical amplitude and phase modulator (optical IQ modulator) as the phase retrieval problem, the above-described imbalance can be estimated using a simple device.

DESCRIPTION OF PREFERRED EMBODIMENTS

The following describes embodiments for carrying out the present invention using the drawings. The present invention is not limited to the embodiments described below, but includes modifications from the following embodiments appropriately made by those skilled in the art within the obvious scope.

Figure 1:
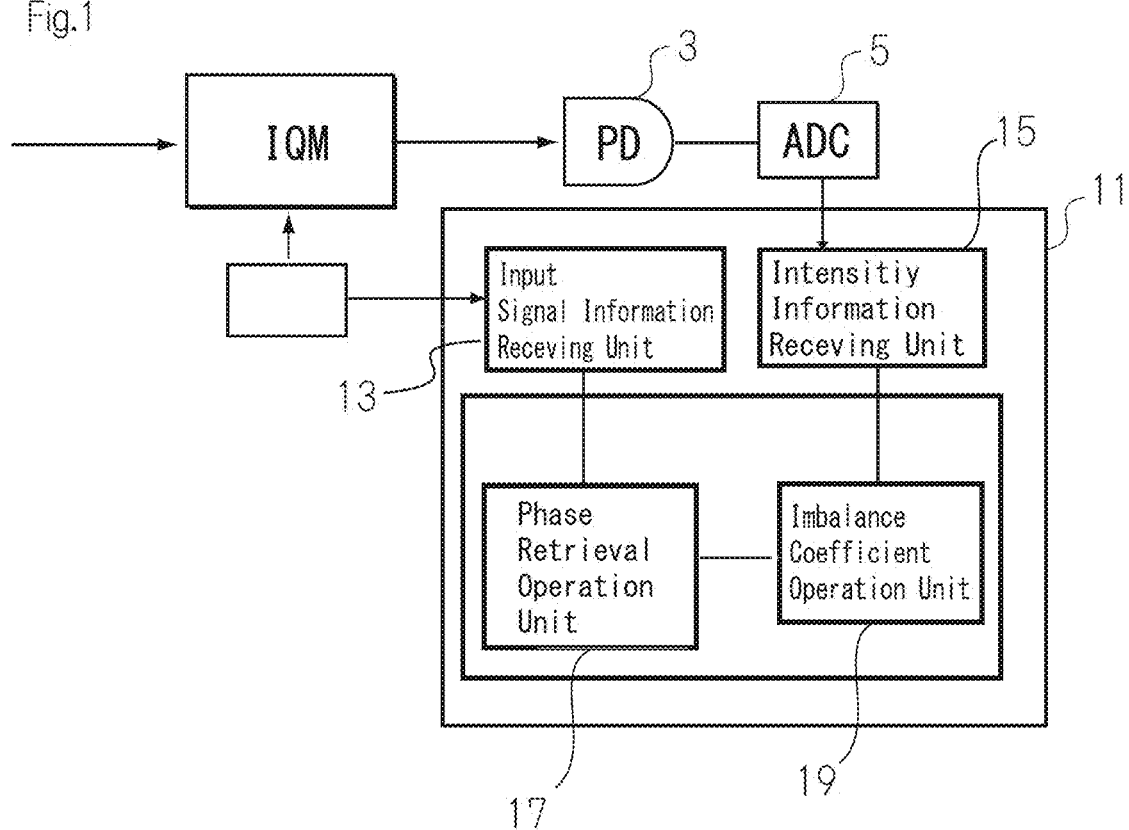
FIG. 1 is a block diagram for describing a property evaluation system of an optical amplitude and phase modulator (optical IQ modulator).

FIG. 1 is a block diagram for describing a property evaluation system of an optical amplitude and phase modulator (optical IQ modulator). The system is a system for estimating an imbalance between electrical-optical responses of an in-phase (I) channel and a quadrature (Q) channel in an optical amplitude and phase modulator. By estimating the imbalance between the electrical-optical responses of the I channel and the Q channel in the optical IQ modulator, the imbalance is output, the property of the optical IQ modulator can be evaluated, and control in consideration of this imbalance (for example, adjusting a modulation signal applied to the optical IQ modulator) can be performed. As illustrated in FIG. 1, this property evaluation system 1 of an optical amplitude and phase modulator has an optical detector (PD) 3, an analog-digital converter (ADC) 5, and an imbalance operation unit 11.

The optical detector (PD) 3 is an element for measuring an intensity component of a first output signal from an optical IQ modulator when a first modulation signal is input to the optical IQ modulator.

The analog-digital converter (ADC) 5 is an element for converting the intensity component of the first output signal received by the optical detector (PD) into a digital signal to obtain intensity information of a digitalized output signal.

The imbalance operation unit 11 is an element for estimating an imbalance between electrical-optical responses of an I channel and a Q channel in the optical IQ modulator. The imbalance operation unit 11 is connected to, for example, a signal source of the first modulation signal and the analog-digital converter (ADC) 5 so as to exchange information. The imbalance operation unit 11 preferably has a control device (computer).

Figure 2:
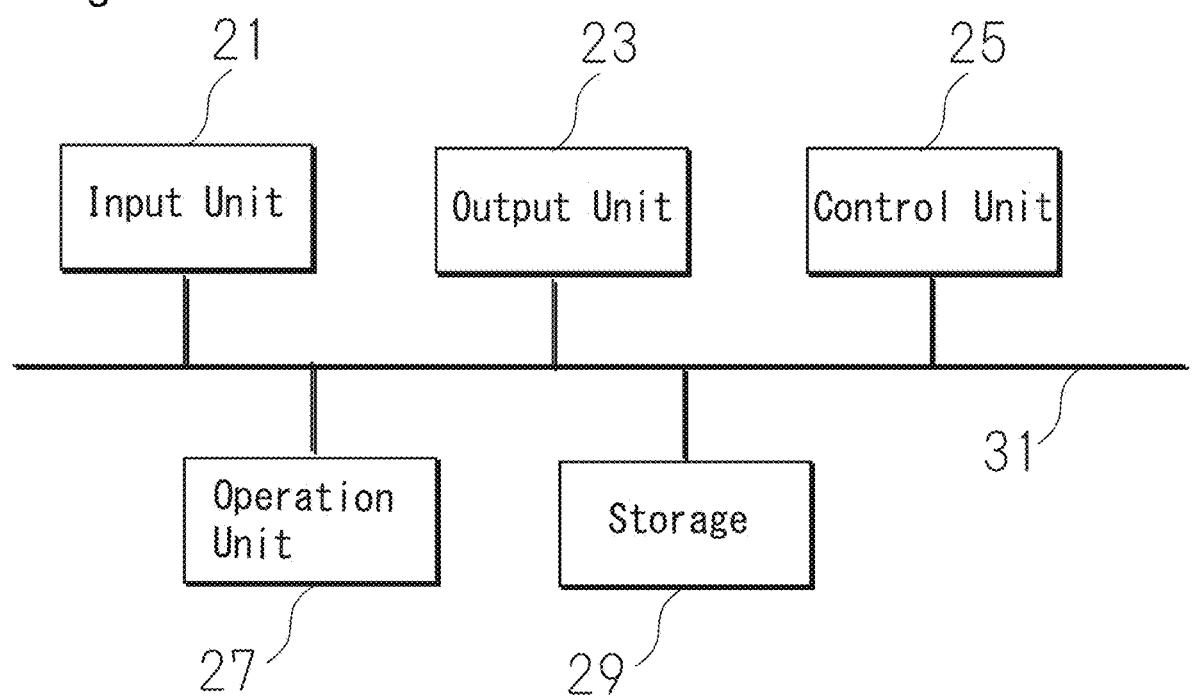
FIG. 2 is a block diagram illustrating a basic configuration of a computer.

FIG. 2 is a block diagram illustrating a basic configuration of a computer. As illustrated in this drawing, the computer has an input unit 21, an output unit 23, a control unit 25, an operation unit 27, and a storage unit 29, and each element is configured to be connected via a bus 31 and the like and transmit and receive information. For example, in the storage unit, a control program may be stored, or various kinds of information may be stored. When predetermined information is input from the input unit, the control unit reads out the control program stored in the storage unit. Then, the control unit appropriately reads out the information stored in the storage unit and transmits the information to the operation unit. Additionally, the control unit appropriately transmits input information to the operation unit. The operation unit performs operation processing using the received various kinds of information and stores it in the storage unit. The control unit reads out an operation result stored in the storage unit and outputs the operation result from the output unit. Thus, various kinds of processing are performed.

The imbalance operation unit 11 is implemented by the above-described computer. Each unit described below is implemented by each element of the computer and the control program stored in the storage unit.

The imbalance operation unit 11 has an input signal information receiving unit 13 and an intensity information receiving unit 15. The imbalance operation unit 11 estimates the imbalance between the electrical-optical responses of the I channel and the Q channel in the optical IQ modulator using the information regarding the first modulation signal and the intensity information of the digitalized output signal. In order to perform the above-described estimation, the imbalance operation unit 11 may further have, for example, a phase retrieval operation unit 17 and an imbalance coefficient operation unit 19.

The input signal information receiving unit 13 is an element for receiving the information regarding the first modulation signal. The input unit 21 of the control device functions as the input signal information receiving unit 13. The imbalance operation unit 11 may be electrically connected to, for example, the signal source of the first modulation signal. Accordingly, the imbalance operation unit 11 can receive the information regarding the first modulation signal from the signal source. An example of the information regarding the first modulation signal is information (s(t)) regarding time change of an intensity and a phase of a signal of first modulation. As long as (s(t)) is a preliminarily determined series, the imbalance operation unit 11 need not receive (s(t)) from the signal source of the first modulation signal. In this case, the imbalance operation unit 11 may read out the information (s(t)) regarding the time change of the intensity and the phase of the signal of first modulation stored in the storage unit 29 and receive the information regarding the read first modulation signal.

The intensity information receiving unit 15 is an element for receiving the intensity information of the digitalized output signal from the analog-digital converter (ADC) 5. The input unit 21 of the control device functions as the intensity information receiving unit 15. The imbalance operation unit 11 is electrically connected, for example, so as to be able to receive information from the analog-digital converter (ADC) 5. Accordingly, the intensity information receiving unit 15 can receive the intensity information of the digitalized output signal from the analog-digital converter (ADC) 5.

The phase retrieval operation unit 17 is an element for performing a phase retrieval operation for retrieving phase information of an output signal from intensity information ($|E(t)|^2$) of the digitalized output signal based on the information (s(t)) regarding the first modulation signal.

The imbalance coefficient operation unit 19 is an element for calculating an imbalance parameter from a phase-retrieved output signal (E(t)) and the information (s(t)) regarding the first modulation signal.

For example, the control unit 25, the operation unit 27, and the storage unit 29 (and the control program stored in the storage unit 29) of the control device function as the phase retrieval operation unit 17 and the imbalance coefficient operation unit 19. The phase retrieval operation unit 17 estimates the imbalance between the electrical-optical responses of the I channel and the Q channel in the optical IQ modulator by calculating an imbalance coefficient by the imbalance coefficient operation unit 19 with respect to the phase-retrieved output signal ($E_{out}(t)$) obtained by the phase retrieval operation unit.

The imbalance operation unit 11 appropriately stores, for example, the information regarding the first modulation signal received by the input signal information receiving unit 13 and the intensity information of the digitalized output signal received by the intensity information receiving unit 15 in the storage unit. Then, the imbalance operation unit 11 calculates the imbalance parameter by causing the phase retrieval operation unit 17 and the imbalance coefficient operation unit 19 to perform predetermined operations using the information regarding the first modulation signal and the intensity information of the digitalized output signal from the storage unit to estimate the imbalance between the electrical-optical responses of the I channel and the Q channel in the optical IQ modulator. Specific operation principle will be as described later.

The imbalance between the electrical-optical responses of the I channel and the Q channel in the optical IQ modulator includes, for example, any one or two or more of parameters regarding the imbalance of:

impulse responses and frequency responses of the I channel and the Q channel in the optical IQ modulator, a frequency dependence of a phase mismatch between the electrical-optical responses of the I channel and the Q channel in the optical IQ modulator, a frequency dependence of an amplitude mismatch between the electrical-optical responses of the I channel and the Q channel in the optical IQ modulator, a DC bias component of the I channel and the Q channel in the optical IQ modulator, and a frequency dependence of nonlinear distortions of the I channel and the Q channel in the optical IQ modulator.

Impulse Responses and Frequency Responses of I Channel and Q Channel in Optical IQ Modulator The impulse responses of the I channel and the Q channel can be expressed by a common component $h_+(t)$ and an error component $h_-(t)$ of the I channel and the Q channel. As described later, the impulse responses of the I channel and the Q channel can be obtained by estimating $h_+(t)$ and $h_-(t)$.

Further, by spectrally analyzing the impulse responses by a method, such as a Fourier transform and a periodogram method, the frequency responses of the I channel and the Q channel can be estimated. The frequency response provides an output amplitude and an output phase when an input signal having a certain frequency is applied to the I channel or the Q channel.

Frequency Dependence of Amplitude Mismatch Between Electrical-Optical Responses of I Channel and Q Channel in Optical IQ Modulator The frequency dependence of the amplitude mismatch between the electrical-optical responses of the I channel and the Q channel in the optical IQ modulator can be estimated by analyzing the error component $h_-(t)$ and calculating an amplitude component of the frequency responses.

Frequency Dependence of Phase Mismatch Between Electrical-Optical Responses of I Channel and Q Channel in Optical IQ Modulator The frequency dependence of the phase mismatch between the electrical-optical responses of the I channel and the Q channel in the optical IQ modulator can be estimated by spectrally analyzing the error component $h_-(t)$ and calculating a phase component of the frequency responses.

DC Bias Component of I Channel and Q Channel in Optical IQ Modulator

The DC bias component of the I channel and the Q channel in the optical IQ modulator is a shift of a DC component of a modulation signal and a DC component in an optical modulator output.

The DC bias component of the I channel and the Q channel in the optical IQ modulator can be expressed by δ. As described later, a DC bias of the I channel and the Q channel in the optical IQ modulator can be estimated by estimating δ.

Nonlinear Distortion of I Channel and Q Channel in Optical IQ Modulator

The nonlinear distortion of the I channel and the Q channel in the optical IQ modulator is a response that depends on an amplitude and phase state of the modulation signal, which cannot be expressed in a form of a linear system, such as the impulse response, among the responses of the I channel and the Q channel in the optical IQ modulator.

By adopting a function that expresses a nonlinear response, such as a Volterra filter, in the imbalance coefficient operation unit 19, the imbalance operation unit 11 causes the phase retrieval operation unit 17 and the imbalance coefficient operation unit 19 to perform predetermined operations to be able to estimate the nonlinear distortion of the I channel and the Q channel in the optical IQ modulator.

Note that the imbalance operation unit 11 may receive information regarding an optical signal input to the optical IQ modulator (for example, information regarding time change of an intensity and a phase of the optical signal). In this case, for example, the imbalance operation unit 11 may be connected to a light source of the optical signal. Before the optical signal is input to the optical IQ modulator, the optical signal may be branched, one of the branched optical signals may be detected by the optical detector, the intensity of the detected optical signal may be converted into a digital signal, and the imbalance operation unit 11 may receive the digital signal. Furthermore, the information regarding the optical signal input to the optical IQ modulator (for example, the information regarding time change of the intensity and the phase of the optical signal) may be stored in the storage unit 29, and the information may be read out from the storage unit 29.

The imbalance between the electrical-optical responses of the I channel and the Q channel in the optical IQ modulator includes, for example, any one or two or more of parameters regarding the imbalance of:

the impulse responses and the frequency responses of the I channel and the Q channel in the optical IQ modulator, the frequency dependence of the phase mismatch between the electrical-optical responses of the I channel and the Q channel in the optical IQ modulator, the frequency dependence of the amplitude mismatch between the electrical-optical responses of the I channel and the Q channel in the optical IQ modulator, the DC bias component of the I channel and the Q channel in the optical IQ modulator, and the frequency dependence of the nonlinear distortion of the I channel and the Q channel in the optical IQ modulator.

A second aspect relates to a method for estimating an imbalance between electrical-optical responses of an in-phase (I) channel and a quadrature (Q) channel in an optical amplitude and phase modulator (optical IQ modulator).

Figure 3:
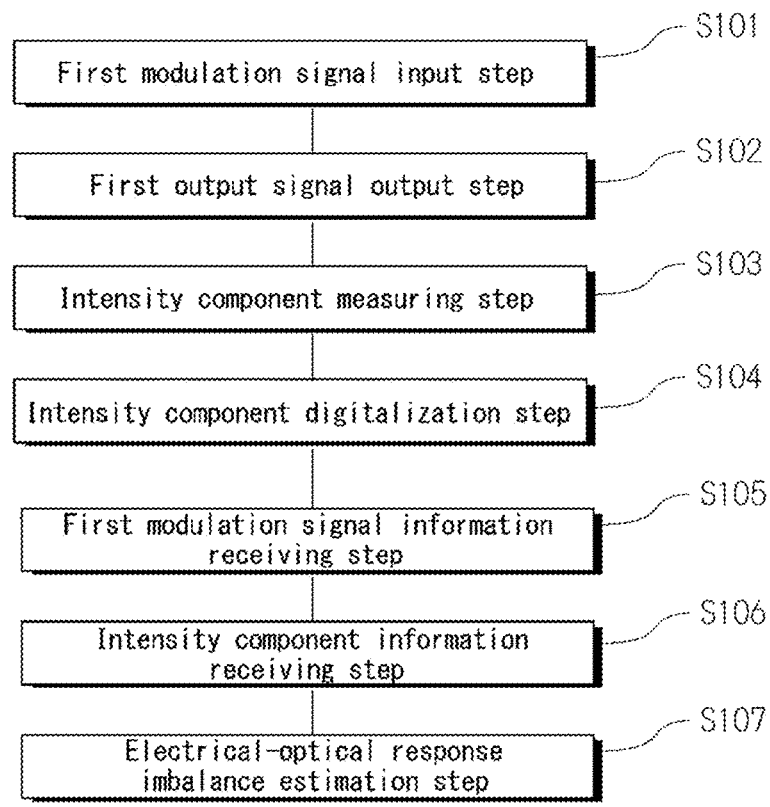
FIG. 3 is a flowchart illustrating an example of processing for estimating an imbalance of electrical-optical responses.

FIG. 3 is a flowchart illustrating an example of processing for estimating the imbalance of the electrical-optical responses. As illustrated in FIG. 3, the method includes the following steps. S denotes a step.

A first modulation signal is input to an optical IQ modulator (S101).

A first output signal is output after an optical signal input to the optical IQ modulator undergoes IQ modulation based on the first modulation signal by the optical IQ modulator (S102).

An optical detector (PD) measures an intensity component of the first output signal after receiving the first output signal (S103).

An analog-digital converter (ADC) converts the intensity component of the first output signal measured by the optical detector (PD) into a digital signal to obtain intensity information of a digitalized output signal (S104).

An imbalance estimating device receives information regarding the first modulation signal (S105).

The imbalance estimating device receives the intensity information of the digitalized output signal from the ADC (S106).

The imbalance estimating device estimates an imbalance between electrical-optical responses of an I channel and a Q channel in the optical IQ modulator using the information regarding the first modulation signal and the intensity information of the digitalized output signal (S107).

The following describes the principle of the present invention.

Figure 4:
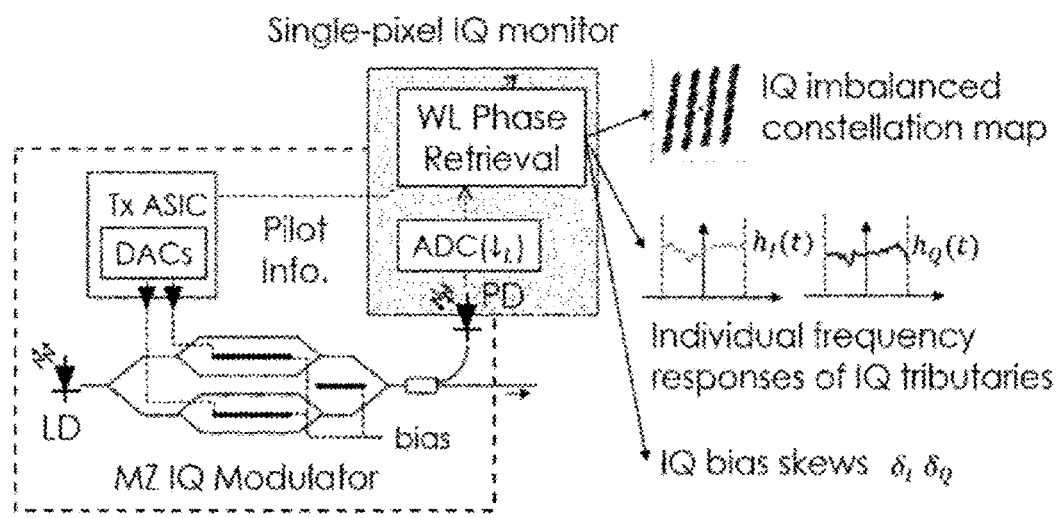
FIG. 4 is a schematic diagram of a property evaluation system (SP-IQM) of an optical amplitude and phase modulator of present invention.

FIG. 4 is a schematic diagram of a property evaluation system (SP-IQM) of an optical amplitude and phase modulator of the present invention. The SP-IQM is configured of an optical detector (PD), an analog-digital converter (ADC), and an operation unit.

Assuming that an optical IQ modulator is driven in a linear region, a complex envelope amplitude E(t) of an optical electric field in an IQ modulator output when a frequency-dependent IQ imbalance exists can be described in the next widely linear (WL) model, for example, as shown in L. Anttila, M. Valkama, and M. Renfors, "Frequency-Selective I/Q Mismatch Calibration of Wideband Direct-Conversion Transmitters," IEEE Trans. Circuits Syst. Express Briefs 55(4), 359-363 (2008).

$$E(t)=E_O\{h_+(t)*s(t)+h_-(t)*s*(t)+\delta\} \quad \text{[Math. 1]}$$

Here, $E_0$ is an optical carrier wave input to the modulator, and s(t) denotes a modulation signal. * denotes a linear convolution, and (•)* denotes a complex conjugate.

For example, the impulse responses $h_+(t)$ and $h_-(t)$ can be associated with a response in an individual circuit inside the optical IQ modulator as described below.

$$h_{+/-}(t) = \frac{\{g_I(t) \pm (1+\epsilon)g_Q e^{j\theta}\}}{2} \quad \text{[Math. 2]}$$

$g_I(t)$ and $g_Q(t)$ denote respective impulse responses of an I channel and a Q channel caused by a modulation signal input electric circuit, such as a DAC, an RF amplifier, a printed board trace routing, and $\epsilon$ and $\theta$ denote amplitude and phase shifts in an optical amplitude and phase modulator modulation. $\delta$ denotes an optical bias component in the modulator output. In a case of an ideal optical IQ modulator without an imbalance, s(t) and E(t) are proportionate.

For estimation of a modulator IQ imbalance, a coherent receiver is generally used. In this case, since it is possible to observe a modulator output electric field E(t) including its phase information, $h_+(t)$, $h_-(t)$, and 6 can be directly estimated in accordance with the WL model. Such an imbalance estimation method is known under the name of a modulation analyzer and the like. Since a modulation analyzer is composed of a sufficiently calibrated high-precision coherent receiver, there is a problem in terms of cost and integration into a modulation circuit.

On the other hand, an IQ imbalance estimation method using only a PD is low-cost and allows integration into a modulation circuit. However, in a direct detection by the PD, only the intensity information $|E(t)|^2$ of the modulator output electric field E(t) is detectable, and phase information is lost. Therefore, for example, in the conventional imbalance estimation method using only a PD, such as J. C. M. Diniz, F. Da Ros, E. P. da Silva, R. T. Jones, and D. Zibar, "Optimization of DP-M-QAM Transmitter Using Cooperative Coevolutionary Genetic Algorithm," J. Lightwave Technol. 36(12), 2450-2462 (2018), by using a special reference signal, such as a dither signal and a tone signal, as s(t), the IQ imbalance including the phase information is estimated from $|E(t)|^2$. In such a method, there are problems, such as that only $\epsilon$ and $\theta$ independent of a frequency among the imbalance components can be estimated, that an imbalance evaluation during data transmission is difficult, or that a signal quality deteriorates due to a superimposed reference signal.

The SP-IQM of the present invention is different from the conventional imbalance estimation method using a tone signal and the like, and estimates $h_+(t)$, $h_-(t)$, and $\delta$ from $|E(t)|^2$ and a random signal series s(t) by a phase retrieval technique. This ensures an imbalance estimation that allows integration into a modulation circuit without requiring an expensive coherent receiver and can be used during data transmission.

Assuming that the responses of the PD and the ADC are ideal, the WL model in a discrete time domain after the ADC is given by:

$$r=|h_+^T s+h_-^T s*+\delta 1|^2 \quad \text{[Math. 3]}$$

Here, an L×1 real number vector r is received intensity information in the discrete time domain, L×1 complex vectors $h_+$ and $h_-$ are $h_+(t)$ and $h_-(t)$ in the discrete time domain, and s is an L×1 signal vector composed of s(t). L denotes a memory length of the impulse responses $h_+(t)$ and $h_-(t)$ in the discrete time domain. An L×1 vector 1 indicates a vector having elements that are all 1, and $(\bullet)^T$ denotes a translocation.

As shown in Y. Yoshida, T. Umezawa, A. Kanno, and N. Yamamoto, "A Phase-Retrieving Coherent Receiver Based on Two-Dimensional Photodetector Array," J. Lightwave Technol. 38(1), 90-100 (2020), when K pieces of independent signal blocks are transmitted as $s_k$, an estimation problem of the responses $h_+$, $h_-$, and $\delta$ of the IQ modulator is given by the following formula.

find $h'$ $$s.t. \ r_k=|h'^T s'_k|^2 (k=1, \ldots, K), \quad \text{[Math. 4]}$$

Here, $$h' := \begin{bmatrix} h_+ \\ h_- \\ \delta \end{bmatrix}, s'_k := \begin{bmatrix} s_k \\ s_k^* \\ 1 \end{bmatrix} \quad \text{[Math. 5]}$$

is provided. This problem is mathematically equivalent to a problem known as a phase retrieval problem in many fields, such as crystallography and diffraction imaging. Therefore, mathematical knowledge in those fields can be utilized in the estimation problem of the IQ imbalance using the PD.

For example, as introduced in Y Shechtman, Y C. Eldar, O. Cohen, H. N. Chapman, J. Miao, and M. Segev, "Phase Retrieval with Application to Optical Imaging: A contemporary overview," IEEE Signal Process. Mag. 32(3), 87-109 (2015), in the phase retrieval field, there are numerous preceding studies about necessary and sufficient conditions for unique retrieval and a phase retrieval algorithm.

First, as uniqueness of the phase retrieval, 4N-4 conjecture is shown in A. S. Bandeira, J. Cahill, D. G. Mixon, and A. A. Nelson, "Saving phase: Injectivity and stability for phase retrieval," Appl. Comput. Harmon. Anal. 37(1), 106-125 (2014). That is, 4N-4 pieces of intensity information obtained based on a random projection process are enough to uniquely determine phases of N pieces of unknown variables. In the IQ imbalance estimation problem, the random projection process corresponds to a modulator input signal $s_k$ (k=1, ..., K) on a formula, and the forecast means that when K is sufficiently large (for example, K>8L) with respect to an element count of an unknown variable vector h' that is a target of the estimation, h' can be uniquely estimated including its phase. Since $s_k$ may be a random series, $s_k$ can be a transmission data series as long as it is already-known in the operation unit of the SP-IQM, and the imbalance estimation during the data transmission is possible.

Next, about the phase retrieval algorithm, since the IQ imbalance estimation problem is a general format as the phase retrieval, many of existing phase retrieval algorithms are applicable. For example, the phase retrieval algorithm may be an alternative projection as typified by the Gerchberg-Saxton method, may be based on a convex optimization method, such as PhaseLift, PhaseMax, and PhaseCut, may be stochastic gradient descent as typified by Wirtinger Flow, or may be based on an approximate message passing and an augmented Lagrangian method, such as an alternating direction method of multipliers (ADMM).

In this working example, a phase retrieval algorithm PhareADMM based on ADMM shown in J. Liang, P. Stoica, Y. Jing, and J. Li, "Phase Retrieval via the Alternating Direction Method of Multipliers," IEEE Signal Process. Lett. 25(1), 5-9 (2018). is employed. In the PhareADMM, for the phase retrieval problem, by minimizing a loss function based on an amplitude error given by:

$$l(h')=\Sigma_{k=1}^{K}|\sqrt{r_k}-|h'^T s'_k||^2 \qquad \text{[Math. 6]}$$

based on the augmented Lagrangian method, h' is estimated.

Note that in the above-described explanation, while the imbalance in the optical IQ modulator is formulated by the WL model, in the SP-IQM of the present invention, any IQ imbalance model may be used as long as the IQ imbalance model can be consequently expressed in a format of the phase retrieval problem. For example, the IQ imbalance model may treat a real part and an imaginary part of a complex equivalent low-pass representation individually as vectors, or may include a nonlinear response that can be expressed in a format of a vector operation, such as a Volterra filter.

Working Example

Figure 5:
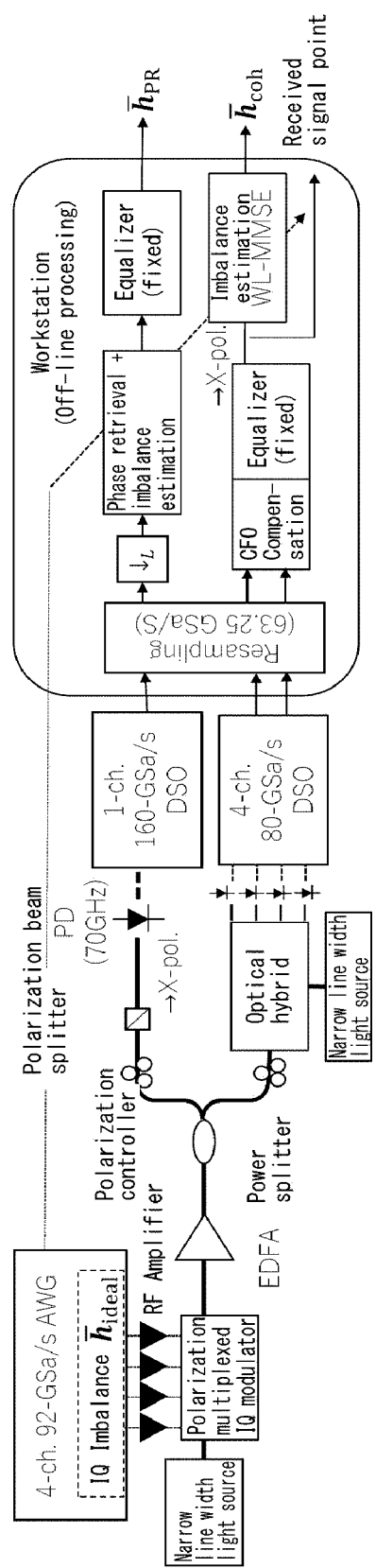
FIG. 5 is a drawing illustrating a demonstration experimental system for a principle verification of the present invention.

FIG. 5 illustrates a demonstration experimental system for a principle verification of the present invention.

Using an optical IQ modulator using a Mach-Zehnder interferometer (MZI), a 92 GSa/s arbitrary RF waveform generator (AWG) for driving the modulator, and a 1550 nm band narrow line width light source, a 63.25 Gbaud polarization multiplexed 16QAM optical modulation signal is generated. A signal series was a random series, and about 80,000 symbols in the signal series were used as pilot signals for the imbalance estimation. An optical signal is amplified by an erbium-doped fiber amplifier (EDFA) and then branched into two by a power splitter. One is input to the SP-IQM after only an X polarized wave component is separated by a polarization beam splitter (PBS). The SP-IQM was composed of a PD with a 3 dB bandwidth of 70 GHz and a real-time sampling oscilloscope (DSO) at 160 GSa/s, and an operation unit that performs a phase retrieval and an imbalance estimation was implemented on a workstation as off-line processing. The PhareADMM was used as a phase retrieval algorithm. In the principle verification experiment, while a broadband system of measurement was used to ignore an influence of bandwidth limiting of the PD and the DSO, an effective sampling rate in phase retrieval processing is 4.2 GSa/s. The other power splitter output is input to an optical modulation analyzer using a coherent receiver. The coherent receiver was composed of a 4-channel DSO at 80 GSa/s, a narrow line width light source, and an optical hybrid circuit, and operation processing in the modulation analyzer was implemented off-line similarly to the SP-IQM. In a case of coherent reception, although a frequency deviation (CFO) between a transmitter and receiver light sources becomes a problem, this was compensated by performing a signal spectral analysis prior to the imbalance estimation. In the imbalance estimation in the modulation analyzer, a minimum mean square error estimation using a WL model (WL-MMSE) shown in T. Adali, P. J. Schreier, and L. L. Scharf, "Complex-Valued Signal Processing: The Proper Way to Deal With Impropriety," IEEE Trans. Signal Process. 59(11), 5101-5125 (2011), and the like was used. Mismatch between frequency responses caused by analog circuits of the SP-IQM and a modulation analyzer are compensated by a fixed linear equalizer. Since it is not easy to strictly control IQ imbalance and its frequency dependence in particular in an actual IQ modulator, in this demonstration experiment, an imbalance was simulated with a digital filter based on a discrete time WL model in the transmitter side AWG. In the following, an impulse response of the digital filter was defined as $h'_{ideal}$, an estimation result by the SP-IQM was defined as $h'_{PR}$, an estimation result of the modulation analyzer using the coherent receiver was defined as $h'_{coh}$, and $$MSE(h') := E\left[\frac{|h' - h'_{ideal}|^2}{|h'_{ideal}|^2}\right] \qquad \text{[Math. 7]}$$

an average estimation error was defined by the above-described formula.

Figure 6:
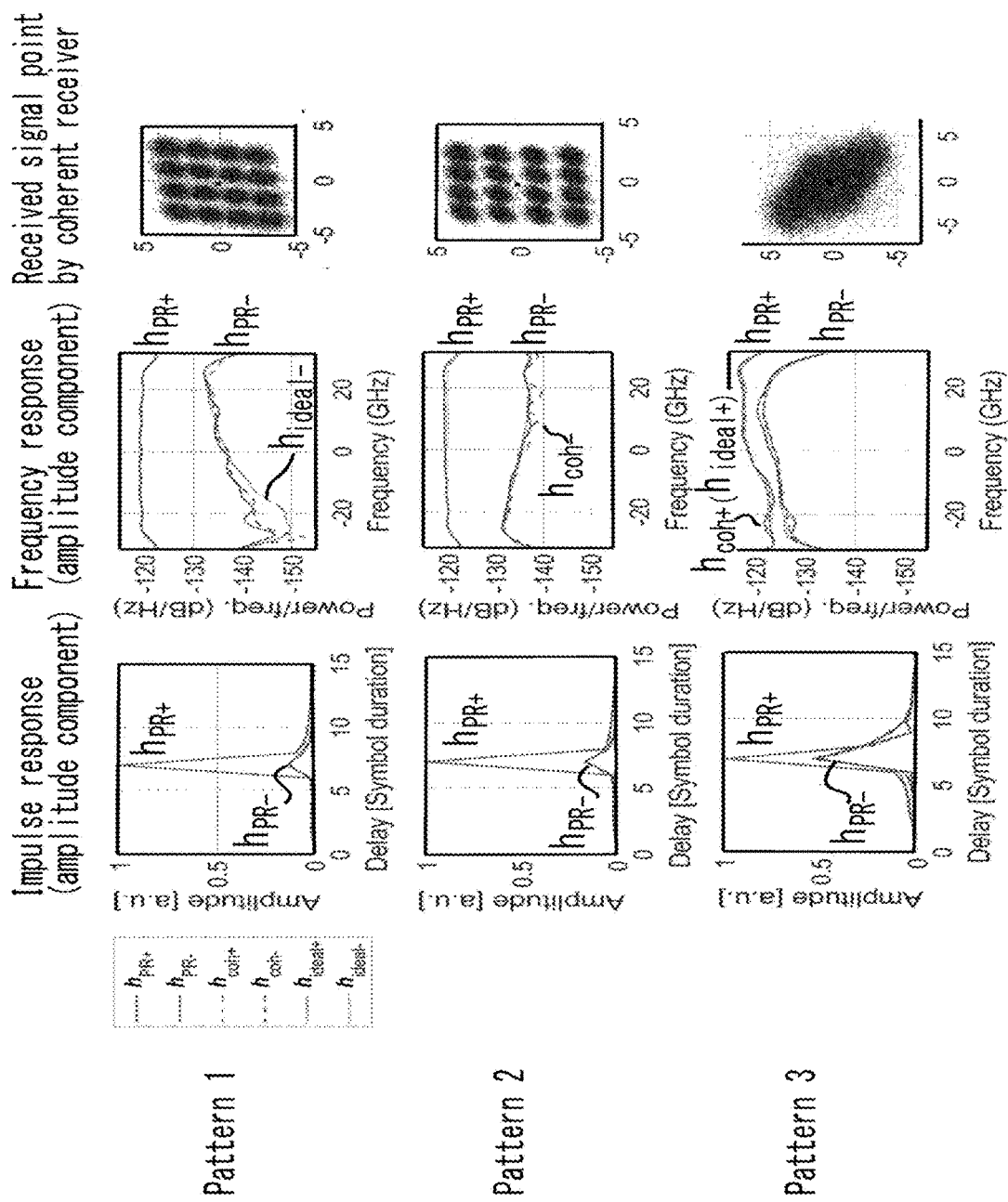
FIG. 6 is a drawing illustrating an example of an estimated impulse response, a frequency response calculated from the impulse response, and received signal points actually observed in a modulation analyzer with respect to three patterns of $h'_{ideal}$.

FIG. 6 is a drawing illustrating examples of estimated impulse responses, frequency responses calculated from the impulse responses, and received signal points actually observed in the modulation analyzer with respect to three patterns of $h'_{ideal}$. While only the amplitude components of the impulse responses and the frequency responses are indicated for the convenience of graphical representation, the estimation has been performed including the phase as described above. From FIG. 6, a satisfactory match can be seen between $h'_{ideal}$, $h'_{PR}$, and $h'_{coh}$. Average MSE properties in these three patterns were MSE($h'_{PR}$)=2.2×10$^{-3}$ and MSE ($h'_{coh}$)=3.5×10$^{-3}$. Although the modulation analyzer is more accurate than the SP-IQM because the coherent reception is superior in sensitivity in principle compared with the direct detection, it can be seen that the SP-IQM was able to achieve a sufficient estimation accuracy with its simple configuration. The MSE properties in the experiment have been calculated with reference to $h'_{ideal}$. However, $h'_{ideal}$ does not include an IQ imbalance in an actual experimental system. Meanwhile, $h'_{coh}$ includes not only an IQ imbalance in the IQ modulator but also an IQ imbalance in the coherent receiver. Therefore, it should be added that the MSE properties have a certain error floor.

Figure 7:
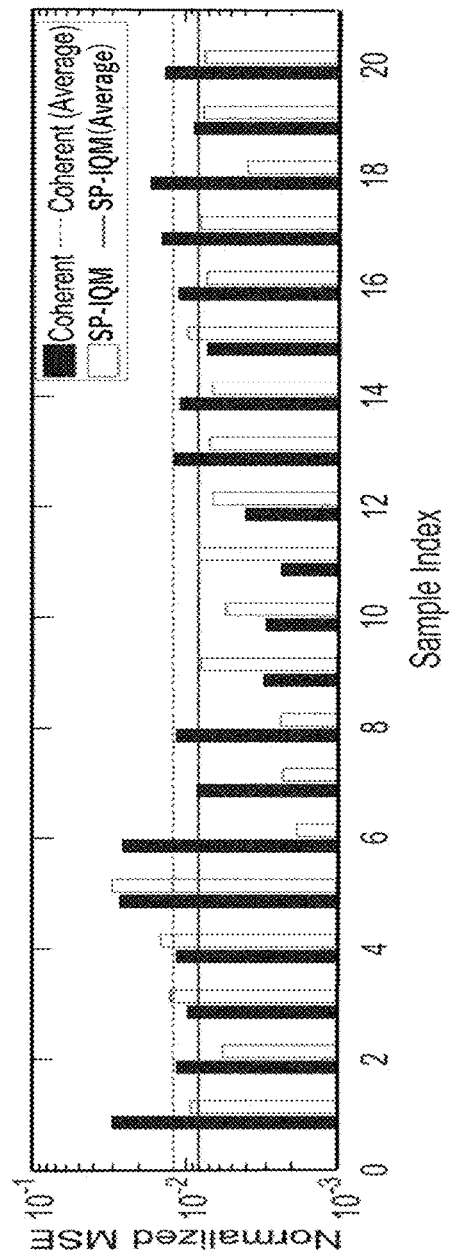
FIG. 7 is a drawing illustrating a mean-squared error (MSE) property per attempt when $h'_{ideal}$ is independently and randomly generated 20 times.

Next, FIG. 7 is a drawing illustrating a MSE property per attempt when $h'_{ideal}$ is independently and randomly generated 20 times. Although there was a variation in estimation accuracy because the degree of the IQ imbalance was different for each attempt, the average MSE properties were MSE($h'_{PR}$)=8.2×10$^{-3}$ and MSE($h'_{coh}$)=1.2×10$^{-2}$, and the SP-IQM exceeded the modulation analyzer in average performance. As shown in F. Horlin and A. Bourdoux, Digital compensation for analog front-ends: Anew approach to wireless transceiver design (John Wiley & Sons, 2008), it is known that the IQ imbalance imposes a negative effect on a CFO compensation accuracy in the coherent reception. It is considered that, in the random attempts, the CFO compensation accuracy in the modulation analyzer lowered in a property sample, and as a consequence, the estimation accuracy of the imbalance parameters lowered.

From the above, it has been demonstrated that the SP-IQM of the present invention can estimate at least the impulse response (here, collectively estimated as h') of each of the I channel and the Q channel in the optical IQ modulator including the phase response and can evaluate up to the frequency dependences (h_) of the intensity and phase shifts between the channels.

INDUSTRIAL APPLICABILITY

The present invention can be used, for example, in information and communication industry.

DESCRIPTION OF REFERENCE SIGNS

1 . . . property evaluation system of optical amplitude and phase modulator
3 . . . optical detector (PD)
5 . . . analog-digital converter
11 . . . imbalance operation unit
13 . . . input signal information receiving unit
15 . . . intensity information receiving unit
17 . . . phase retrieval operation unit
19 . . . imbalance coefficient operation unit

The invention claimed is:

1. A system for estimating an imbalance between electrical-optical responses of an in-phase (I) channel and a quadrature (Q) channel in an optical amplitude and phase modulator (optical IQ modulator) comprising:
an optical detector (PD) for measuring an intensity component of a first output signal from an optical IQ modulator when a first modulation signal is input to the optical IQ modulator;
an analog-digital converter (ADC) for converting an intensity component of a first output signal received by the optical detector (PD) into a digital signal to obtain intensity information of a digitalized output signal; and
an imbalance operation unit that estimates an imbalance between electrical-optical responses of an I channel and a Q channel in the optical IQ modulator, wherein
the imbalance operation unit includes:
an input signal information receiving unit that receives information regarding a first modulation signal; and
an intensity information receiving unit that receives intensity information of the digitalized output signal from the ADC, and
the imbalance operation unit estimates an imbalance between electrical-optical responses of an I channel and a Q channel in the optical IQ modulator using information regarding a first modulation signal and intensity information of the digitalized output signal, wherein
information regarding a first modulation signal is information, s(t), regarding time change of an intensity and a phase of a signal of first modulation,
an imbalance between electrical-optical responses of an I channel and a Q channel in the optical IQ modulator includes any one or two or more of parameters regarding an imbalance of:
impulse responses and frequency responses of an I channel and a Q channel in the optical IQ modulator;
a frequency dependence of a phase mismatch between electrical-optical responses of an I channel and a Q channel in the optical IQ modulator;
a frequency dependence of an amplitude mismatch between electrical-optical responses of an I channel and a Q channel in the optical IQ modulator;
a DC bias component of an I channel and a Q channel in the optical IQ modulator; and
a frequency dependence of nonlinear distortions of an I channel and a Q channel in the optical IQ modulator,
the imbalance operation unit further includes:
a phase retrieval operation unit that performs a phase retrieval operation for retrieving phase information of the output signal from intensity information, $|E(t)|^2$, of the digitalized output signal based on information, s(t), regarding a first modulation signal; and
an imbalance coefficient operation unit that calculates the imbalance parameter from the phase-retrieved output signal, E(t), and information, $E_{in}(t)$, regarding a first modulation signal, and
the imbalance operation unit estimates an imbalance between electrical-optical responses of an I channel and a Q channel in the optical IQ modulator by calculating an imbalance coefficient by an imbalance coefficient operation unit with respect to a phase-retrieved output signal, E(t), obtained by the phase retrieval operation unit.

2. A method for estimating an imbalance between electrical-optical responses of an in-phase (I) channel and a quadrature (Q) channel in an optical amplitude and phase modulator (optical IQ modulator) comprising:
inputting a first modulation signal to an optical IQ modulator;
outputting a first output signal after an optical signal input to the optical IQ modulator undergoes IQ modulation based on a first modulation signal by an optical IQ modulator;
measuring an intensity component of a first output signal by an optical detector (PD) after receiving a first output signal;
converting an intensity component of a first output signal measured by the optical detector (PD) into a digital signal by an analog-digital converter (ADC) to obtain intensity information of a digitalized output signal;
receiving information regarding a first modulation signal by an imbalance estimating device;
receiving intensity information of the digitalized output signal from the ADC by the imbalance estimating device; and
estimating an imbalance between electrical-optical responses of an I channel and a Q channel in the optical IQ modulator by the imbalance estimating device using information regarding a first modulation signal and intensity information of the digitalized output signal, wherein
an imbalance between electrical-optical responses of an I channel and a Q channel in the optical IQ modulator includes any one or two or more of parameters regarding an imbalance of:
impulse responses and frequency responses of an I channel and a Q channel in the optical IQ modulator;
a frequency dependence of a phase mismatch between electrical-optical responses of an I channel and a Q channel in the optical IQ modulator;
a frequency dependence of an intensity mismatch between electrical-optical responses of an I channel and a Q channel in the optical IQ modulator;
a frequency dependence of a DC bias component of an I channel and a Q channel in the optical IQ modulator; and
a frequency dependence of a nonlinear distortion of an I channel and a Q channel in the optical IQ modulator, and
the estimating an imbalance between electrical-optical responses of an I channel and a Q) channel in the optical IQ modulator includes:
performing a phase retrieval operation for retrieving phase information of an output signal from intensity information, $|E(t)|^2$, of the digitalized output signal based on information, s(t), regarding a first modulation signal; and calculating the imbalance parameter from the phase-
retrieved output signal, E(t), and information, s(t),
regarding a first modulation signal.

\* \* \* \* \*